United States Patent
Arakeri et al.

(10) Patent No.: US 6,601,129 B1
(45) Date of Patent: Jul. 29, 2003

(54) INTERFACE DEVICE BETWEEN PC AND KEYBOARD ENABLING SWITCHING OF DATA

(76) Inventors: Arvind Arakeri, 21366 Rumford, Cupertino, CA (US) 95014; Hollis Poche, 999 Kintyre, Sunnyvale, CA (US) 94087

( * ) Notice: Subject to any disclaimer, the term of this patent is extended or adjusted under 35 U.S.C. 154(b) by 379 days.

(21) Appl. No.: 09/759,093

(22) Filed: Jan. 11, 2001

Related U.S. Application Data

(60) Provisional application No. 60/175,547, filed on Jan. 11, 2000.

(51) Int. Cl.[7] .................................................. G06F 13/00
(52) U.S. Cl. ....................... 710/316; 710/300; 710/305; 710/38; 710/63; 710/72; 709/282
(58) Field of Search ................................. 709/218, 227, 709/232–238; 710/36–38, 51, 62–63, 72–73, 100, 300, 305–316

(56) References Cited

U.S. PATENT DOCUMENTS

| | | | |
|---|---|---|---|
| 5,640,566 A | * 6/1997 | Victor et al. ................. | 717/113 |
| 5,841,424 A | * 11/1998 | Kikinis ........................ | 345/168 |
| 6,098,138 A | * 8/2000 | Martinelli et al. ........... | 710/315 |
| 6,101,562 A | * 8/2000 | Chang et al. ................. | 710/73 |
| 6,266,711 B1 | * 7/2001 | Ishikawa et al. ............. | 710/8 |
| 6,475,146 B1 | * 11/2002 | Frelburger et al. .......... | 600/437 |
| 6,487,597 B1 | * 11/2002 | Horie et al. ................. | 709/227 |
| 2002/0164953 A1 | * 11/2002 | Curtis ......................... | 455/41 |

* cited by examiner

Primary Examiner—Christopher B. Shin
(74) Attorney, Agent, or Firm—William Michael Hynes; Townsend amd Townsend and Crew LLP

(57) ABSTRACT

An interface device for placement between a PC and a peripheral device, such as a keyboard or mouse, enables a flow of digital data into and out of a communicating personal digital assistant (PDA). The interface device includes a central processing unit having an input/output to the PC typically at the PS/2 ports (keyboard and/or mouse). The interface device has two input/output ports (infrared and RS 232) for communication to a PDA. Finally the device includes a switch, preferably under software control, to direct and control data flow between the PC, the PDA, and peripheral device. Peripheral device (keyboard or mouse) to PDA, PDA to PC, as well as peripheral device to PC communication can occur. For example, the PDA can act as a touch sensitive surface emulating a mouse-pad wirelessly connected to the PC enabling for example mouse control of projected computer program images for overall computer program control.

10 Claims, 4 Drawing Sheets

Microfiche Appendix Included
(2 Microfiche, 196 Pages)

INTERFACE DEVICE BETWEEN PC AND KEYBOARD ENABLING SWITCHING OF DATA

RELATED PATENT APPLICATION

This disclosure claims priority from Provisional Patent Application Serial No. 60/175,547 filed Jan. 11, 2000 entitled Interface Device Between PC and Keyboard Enabling Switching of Keyboard Data by the named inventors herein. In this regular patent application we render this device generic to enable digital data—such as mouse movements as well as keyboard data—to be transmitted through the disclosed device. A microfiche appendix which contains two microfiche with one hundred and twenty-four frames is attached with this filing of the non-provisional patent application.

This invention relates to an intelligent interface placed between a peripheral device, such as a keyboard and/or mouse, and a PC. More particularly, the intelligent interface enables direct PC input through the peripheral device and enables the peripheral device to be switched from the PC to alternate devices such as a personal digital assistant (PDA). Further, digital data can be directly channeled to the PC from the personal digital assistant through the interface device without use of the peripheral device, such as the keyboard or mouse.

BACKGROUND OF THE INVENTION

Personal computers (PCs) are common. Keyboards are connected to PCs with keyboard connections including a cord with at least two electrical signals, including a clock and data line. The keyboard is the principle user operated device for connection to the PC.

Personal digital assistants (PDA's) are now widely used. These are typically battery-operated devices, which have a viewing screen and an input stylus. Data entry to the PDA is scribed by the stylus, translated by software to the applicable digital character, and entered into the PDA. Alternately, digital information can be entered by being location impressed by the stylus over a alphanumeric graphical representations, such as a QWERTY keyboard. In either event, the stylus inputs on the personal digital assistant touch panel impressions, which then become input data. Through software interpretation, these inputs become PDA digital information.

PDAs are normally backed-up or synchronized by computer. Each PDA normally is provided with a cradle connected to either a serial or USB port of the PC. This cradle defines a saddle for receiving and supporting the PDA and has electrical members (such as a serial or USB port) for "synchronizing"data stored in the PC and data stored in the PDA. Such transfers occur using application software and drivers installed on the P.C. and running under an operating system (such as Windows®, a registered trademark of the Microsoft Corporation). Data is transferred between the PDA and PC. Such transfer occurs through drivers incorporated in the software. Simply stated, data alterations made to shared data in the PC are loaded to the PDA upon synchronization; likewise, data alterations made to the shared data in the PDA are loaded to the PC upon synchronization. It is important to remember that after synchronization, both the PDA and the PC can operate independently.

PDAs are now normally supplied with so-called IRDA interfaces. Such interfaces enable infrared communications between the PDA and other devices, including other PDAs. Additionally the PDA can communicate with PCs having IRDA interfaces. These IRDA interfaces to the PCs are an alternate path for effecting communication and/or synchronization to the PDA in addition to conventional wired connections through the likes of RS 232 ports or so-called USB ports.

Finally, the sophistication of PDAs has now been expanded to include wireless digital transmission of data. For example, PDAs are now capable of sending and receiving E-Mail.

SUMMARY OF THE INVENTION

An interface device for placement between a PC and a peripheral device, such as a keyboard or mouse, enables a flow of digital data into and out of a communicating personal digital assistant (PDA). The interface device includes a central processing unit having an input/output to the PC typically at the PS/2 ports (keyboard and/or mouse). The interface device has two input/output ports (infrared and RS 232) for communication to a PDA. Finally the device includes a switch, preferably under software control, to direct and control data flow between the PC, the PDA, and peripheral device. Peripheral device (keyboard or mouse) to PDA, PDA to PC, as well as peripheral device to PC communication can occur. For example, the PDA can act as a touch sensitive surface emulating a mouse-pad wirelessly connected to the PC enabling for example mouse control of projected computer program images for overall computer program control.

In the parent Provisional Application, a specific embodiment included a keyboard interface device placed between a PC and a keyboard to enhance keyboard communication. The interface device allows the keyboard to directly communicate to a personal digital assistant, and allows the personal digital assistant to directly input keyboard data to the PC. The interface device includes a central processing unit having input from a keyboard and output from a central processing unit to the PC. At least one and preferably two input/output ports (one serial and one IRDA) are used for sending and receiving digital data. The two input/output ports are operably connected to the central processing unit. A switch is placed between the keyboard and central processing unit for disabling the keyboard. When emulated keyboard data is transferred through the interface device, the switch is opened disconnecting the keyboard from the PC. This disconnect enabled the input/output port to direct emulated keyboard data to the PC. Finally, a mode switch—preferably icon directed from the personal digital assistant—switches the central processing unit to channel keyboard data between the keyboard, personal digital assistant, the input/output ports and/or the PC. Keyboard data can flow conventionally from the keyboard to the PC. Keyboard data can flow directly from the keyboard to the PDA through either the serial port or the IRDA. Emulated keyboard data can flow from the PDA (or other device) to the PC through either the serial port or the IRDA. There results programmable and reversible flow of keyboard data through the interface device.

DESCRIPTION OF THE SPECIFIC EMBODIMENTS

Figure 1:
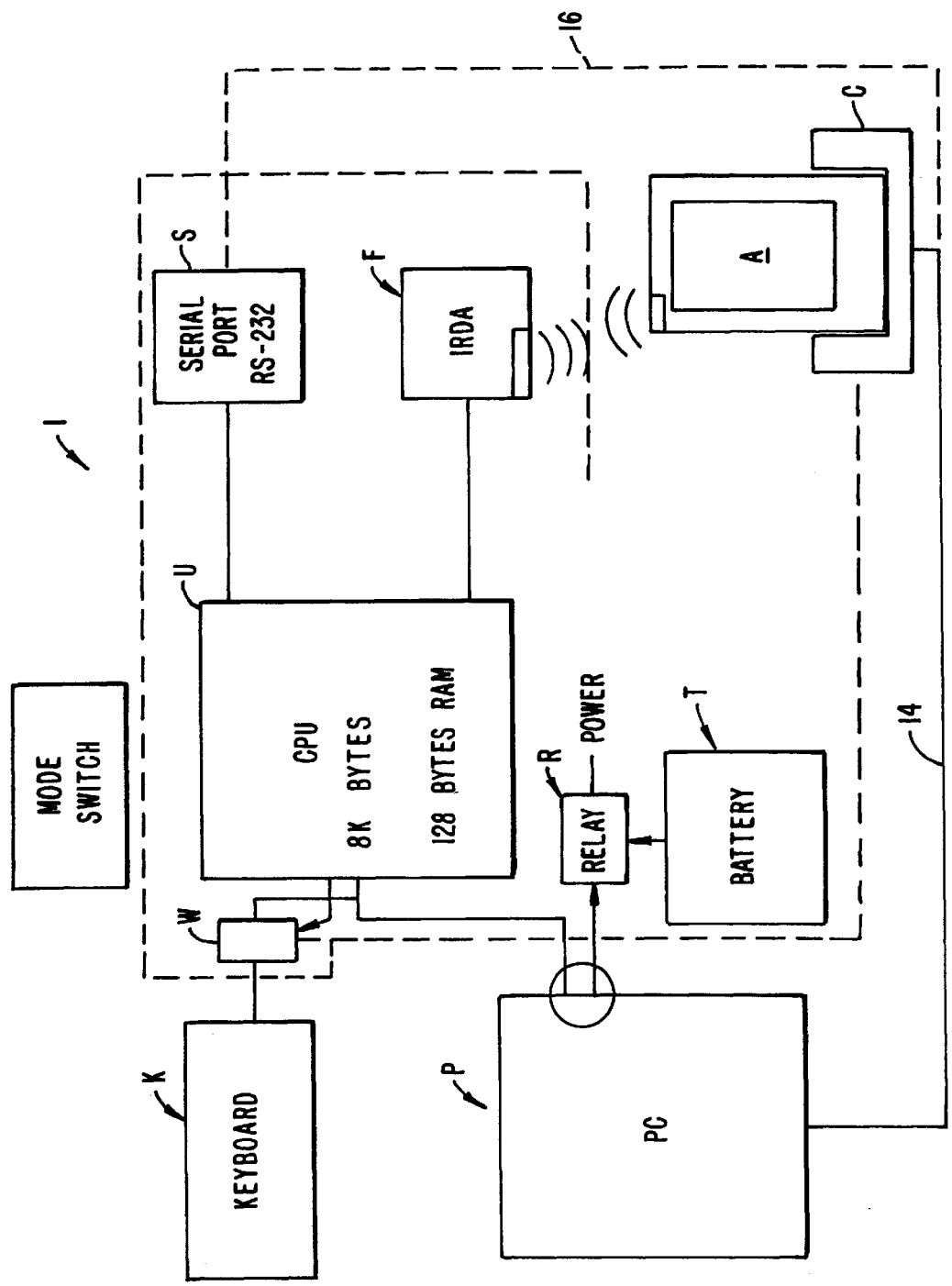
FIG. 1 is a block diagram of the keyboard interface device of this invention schematically showing enclosed in broken lines the keyboard interface device of this invention and illustrating connections to the PC and personal digital assistant; and, FIGS. 2A and 2B are circuit schematics illustrating current operable connects to and from the central processing unit for permitting interface device function; and, FIG. 3 illustrates a PDA being utilized as a wirelessly connected mouse-pad for controlling a program remotely, the touch sensitive surface of the mouse-pad having a discrete area for so-called "right clicking"of the mouse-pad.
Figure 2A:
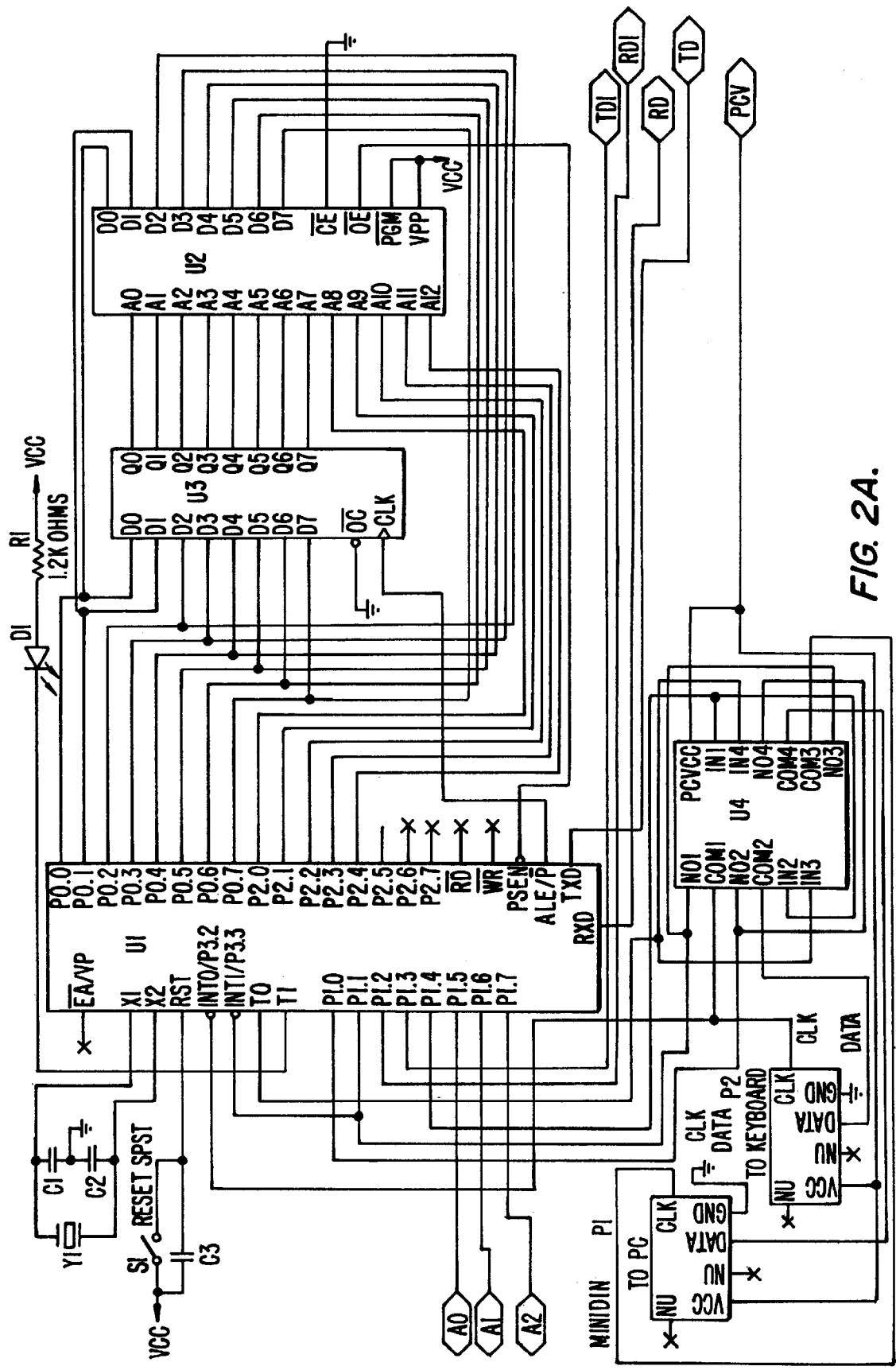
Figure 2B:
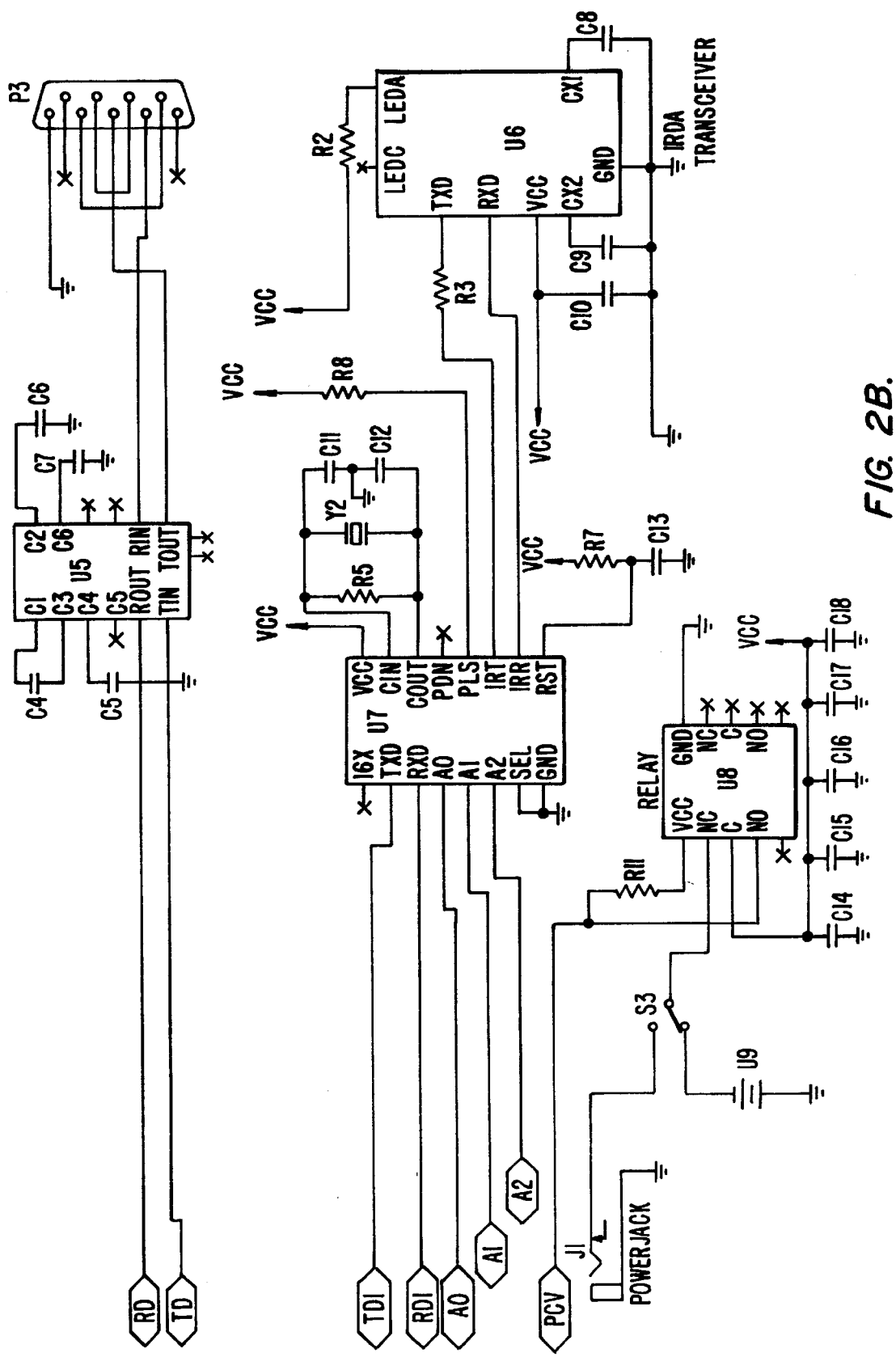

Referring to FIG. 1, a block-diagram schematic of interface device I between keyboard K and personal computer P is shown. Interface device I includes central processing unit U with connected RAM and firmware. Central processing unit U includes input from keyboard K and an input/out put from a serial or IRDA port of personal computer P.

The following specification uses the term "keyboard data."It will be understood that keyboard data is an extreme low level digital transfer that incorporates the PS/2 compatible AT keyboard.

Central processing unit U includes two input/output ports. As shown here serial port S and infrared port F are both a portion of interface device I. It will be understood that communication through either of the ports can occur to and from the personal digital assistant A through central processing unit U.

In the normal case, a connection of the keyboard K to the interface device I will supply sufficient power to the interface device I. Where personal computer P is not connected, it may be desired to supply battery power T to interface device I with relay R activating interface device I.

In the view here shown, personal digital assistant A is provided with a standard port connection 14 from cradle C to personal computer P, this port connection either being a serial or IRDA port connection. These serial or IRDA port connections are typically used for PC to PDA synchronization. Operation of the personal digital assistant A is conventional. It is to be noted that the communication provided by this interface device does not conflict with PDA synchronization; interface device I can supplement the synchronization.

It will be seen that keyboard K is provided with switch W. This switch W is vital to permit communication of keyboard data through infrared port F or serial port S. Specifically, when keyboard data is emulated through either infrared port F or serial port S, verification signals for keyboard data are transmitted from personal computer P to keyboard K. Keyboard K responds to these signals. The result is that the attempted transmission of keyboard data from the interface device to personal computer P is interrupted. We have found by having switch W effectively disconnect keyboard K from personal computer P, direct communication can occur between the interface device I and personal computer P.

The switch W can take many forms. It can be a mechanical switch, an electromechanical switch, or a semiconductor switch. We use a preferred software actuated semiconductor switch.

The digital interface device I when acting as an input device to the PDA has the firmware decode the clock and data signals generated by the keyboard. The keycode is looked up in a table and converted to ASCII code and transmitted to the PDA.

The digital interface device I when acting as input device to the PC with emulated keyboard data from the PDA transmits to the interface device at the IRDA port and has firmware convert the data to scan codes. The data is input to the PC by generating the appropriate signals on the clock and data lines of the keyboard port following the standard AT keyboard protocol. The PC interprets this data as keyboard input.

It will be understood that as an aside, cradle C of personal digital assistant A can be connected to serial port S of interface device I through serial connection 16. In this case, and without the presence of personal computer P, direct data entry from keyboard K through central processing unit U to personal digital assistant A can occur.

Finally, as presently implemented, we have as part of our interface device I mode switch M. This switch places interface device I in any one of the following states:

1. Standard keyboard K to personal computer P connection (normal keyboard data);
2. Keyboard K to personal digital assistant A through serial port S connection (normal keyboard data);
3. Keyboard K to personal digital assistant A through infrared port F connection (normal keyboard data);
4. Personal digital assistant A though interface device I at infrared port F to personal computer P for the input of keyboard data direct to personal computer P (emulated keyboard data); and,
5. Personal digital assistant A through interface device I at serial port S to personal computer P for the input of keyboard data direct to personal computer P (emulated keyboard data).

The reader will understand further, that with the filing of this Non-Provisional Patent Application, communication of the PDA as a mouse-pad in both modes (4.) and (5.) listed above.

The reader will understand that mode switch M can be more conveniently implemented in icons on personal digital assistant A. In this case, personal digital assistant A will effect software switching of interface device I through infrared port F and/or USB port.

It will be understood that the infrared port F provided here may be in addition to that already existing on personal computer P. Further, and where personal computer P does not have an infrared port, the infrared port F provided by this invention effectively provides such communication.

Four areas of use of this interface device are especially useful.

First, for direct development of software for personal digital assistant A, keyboard K having direct input to personal digital assistant A is especially useful. Without this direct input, a file would be written in the PC. Thereafter, the written file would be transferred during synchronization to the PDA. It then would be run on the PDA. Presuming that the software for the PDA was being tested and upgraded, this process would have to be repeated with each software modification.

Second, it is common for personal digital assistant A to have wireless E-mail connections. One specific use for this device is to direct all E-mail through personal digital assistant A. This can occur without the bother of creating a file in the personal computer P, typing the E-mail to the file, equalizing the personal computer P and personal digital assistant A. Once the E-mail is in the PDA, it must typically be transferred from one portion of the personal digital assistant A memory to the E-mail section where the E-mail can conveniently be sent.

Third, the PDA can act as a keyboard to the PC. The interface device accepts IRDA downloads from the PDA. For example, a golf course computer recording scores can receive directly downloaded information from a PDA without the requirement of keyboard input. Thus the PDA directly inputs emulated keyboard data to the PC with no changes to any personal computer application.

Fourth, the PDA can act as a mouse-pad for the PC. As before, the interface device accepts IRDA downloads from the PDA and vice versa. Thus, by utilizing the touch sensitive surface of the mouse-pad, regular so-called mouse movement and co-called "left clicking" can be emulated. Further, by defining a discrete area on the PDA touch sensitive surface, "right clicking" can be achieved.

Figure 3:
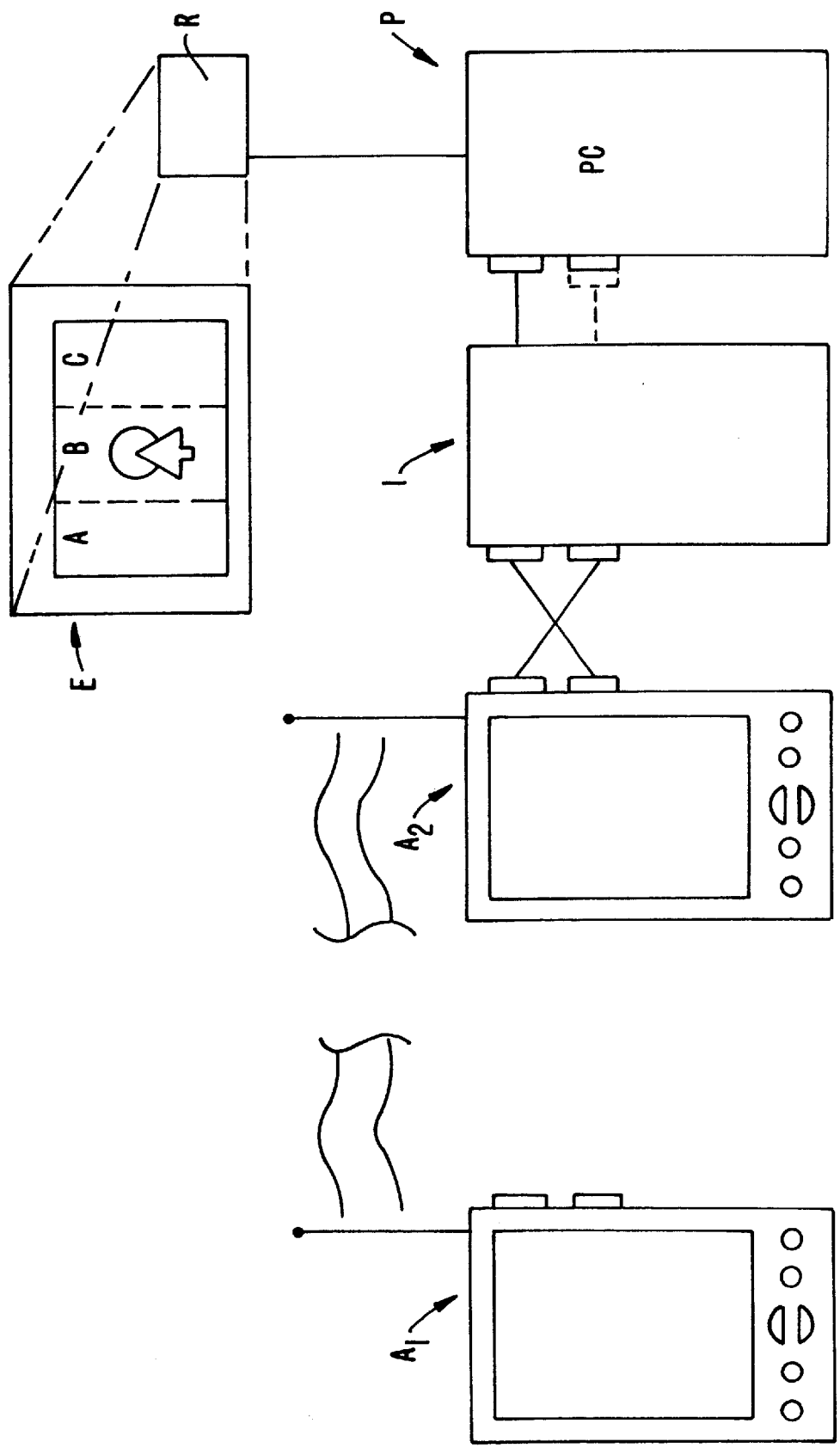

Referring to FIG. 3, the reader will see illustrated a PDA configured as a mouse-pad. In the example shown, PDA $A_1$ receives tactile touch signals at its touch sensitive surface. Wireless transmission to PDA $A_2$ occurs to avoid the presently limited IRDA port range (line of sight) between PDAs of approximately three (3) feet. Thereafter, PDA $A_2$ communicates mouse digital data to interface I, thence to PC P, and finally to a PC connected projector R placing an image on screen E. Attached hereto is code, which enables the illustrated PDA $A_2$ to communicate through the disclosed interface device and function. It will be understood that any relevant movement on the touch sensitive surface of the mousepad will cause corresponding movement of the conventional mouse pointer on a PC. At the same time, the PDA will have its own mouse indicator on the touch sensitive surface of the mouse-pad. This mouse indicator does not have to underlie the actual point of remote mouse manipulation. A preferred use of the illustrated PDA utilized in a wireless capacity can be the emulation of a mouse-pad on a computer. For example, in a conference type presentation, the operator of a displayed computer screen can sit amongst those viewing the presentation with PDA $A_1$ at a site remote from the PC and manipulate the displayed program through mouse interaction with PDA $A_2$, interface I and the PC. As of the filing of this application, software for communication between PDA $A_1$ and PDA $A_2$ has not been completed. This software is believed to be within the skill of the routineer.

This Application is filed with an Appendix. The Appendix includes all software necessary to operate the interface and PDA in the manner described. By way of example, the PDA utilized with this disclosure runs on Palm OS™ Software v.3.1. or greater. The EPROM utilizing an EMPIO Eprom programmer conventionally actuated by a PC.

What is claimed is:

1. An interface device for placement between a PC and a peripheral device for permitting flow of digital data into and out of a personal digital assistant comprising:
    a central processing unit;
    a peripheral device having input/output to the central processing unit;
    an input/output from the central processing to the PC;
    at least one input/output port for sending and receiving digital data operably connected to the central processing unit; and,
    a switch mechanism to direct and control data flow between the PC, personal digital assistant and peripheral device.

2. The interface device for placement between a PC and a peripheral device according to claim 1 and wherein:
    the peripheral device is a keyboard.

3. The interface device for placement between a PC and a peripheral device according to claim 1 and wherein the peripheral device is a mouse.

4. The interface device for placement between a PC and a peripheral device according to claim 1 and wherein a personal digital assistant is programmed as a mouse-pad.

5. An interface device for placement between a PC and a keyboard for permitting flow of keyboard data or emulated keyboard data comprising:
    a central processing unit;
    a keyboard input to the central processing unit;
    an output from the central processing unit to the PC;
    at least one input/output port for sending and receiving digital data operably connected to the central processing unit; and,
    a mechanism/switch to direct and control data flow between the PC, PDA and the PC keyboard.

6. The keyboard interface device according to claim 5 and further comprising:
    the input/output port for sending and receiving digital data is an IRDA port.

7. The keyboard interface device according to claim 5 and further comprising:
    the input/output port for sending and receiving digital data can be a serial port or a USB port.

8. The keyboard interface device according to claim 5 and further comprising:
    the at least one input/output port includes two or more ports.

9. A process for keying data into a PC from a personal digital assistant comprising the steps of:
    providing a central processing unit;
    providing a keyboard input to the central processing unit;
    providing a switch between the central processing unit and keyboard for disabling the keyboard;
    providing an output from the central processing unit to the PC;
    providing at least one input/output port connected to the central processing unit; and,
    opening the switch to disable the keyboard while;
    sending and receiving data from a PDA through the at least one input/output port to the PC using at least one input/output port.

10. A process for keying data into a personal digital assistant from a PC connected keyboard comprising the steps of:
    providing a central processing unit;
    providing a keyboard input to the central processing unit;
    providing a switch between the central processing unit and PC;
    providing an output from the central processing unit to the PC;
    providing at least one input/output port connected to the central processing unit; and,
    opening the switch between the central processing unit and PC to disable the keyboard input to the PC while;
    sending data to the PDA from the central processing unit using at least one input/output port.

* * * * *